(12) United States Patent
Brunel et al.

(10) Patent No.: US 10,075,967 B2
(45) Date of Patent: Sep. 11, 2018

(54) METHOD FOR SIGNALING TIME AND FREQUENCY RESOURCES ALLOCATION IN WIRELESS COMMUNICATION SYSTEM

(71) Applicant: MITSUBISHI ELECTRIC CORPORATION, Tokyo (JP)

(72) Inventors: Loic Brunel, Rennes (FR); Nicolas Gresset, Rennes (FR); Jonathan Letessier, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 16 days.

(21) Appl. No.: 15/506,184

(22) PCT Filed: Oct. 1, 2015

(86) PCT No.: PCT/JP2015/005010
§ 371 (c)(1),
(2) Date: Feb. 23, 2017

(87) PCT Pub. No.: WO2016/056209
PCT Pub. Date: Apr. 14, 2016

(65) Prior Publication Data
US 2017/0290027 A1    Oct. 5, 2017

(30) Foreign Application Priority Data

Oct. 6, 2014 (EP) .................................. 14187733

(51) Int. Cl.
*H04W 72/12* (2009.01)
*H04W 72/04* (2009.01)
(Continued)

(52) U.S. Cl.
CPC ............ *H04W 72/12* (2013.01); *H04B 1/713* (2013.01); *H04L 5/0005* (2013.01);
(Continued)

(58) Field of Classification Search
CPC .............. H04W 72/12; H04W 72/0406; H04L 5/0053; H04L 5/0005; H04L 5/0037; H04B 1/713
See application file for complete search history.

(56) References Cited

U.S. PATENT DOCUMENTS

2010/0103897 A1* 4/2010 Suh ...................... H04B 1/7143
370/329
2013/0252553 A1 9/2013 Hyon et al.
(Continued)

FOREIGN PATENT DOCUMENTS

WO    WO 97/45966 A1    12/1997
WO    WO 2008/008748 A2    1/2008

*Primary Examiner* — Kwang B Yao
*Assistant Examiner* — Moo Ryong Jeong
(74) *Attorney, Agent, or Firm* — Birch, Stewart, Kolasch & Birch, LLP (57) ABSTRACT

For performing K individual transmissions between an access point managing a cell of a wireless communications network to plural mobile terminals via time and frequency resources from amongst a predefined set of candidate time and frequency resources on a per frame period basis, one time and frequency resource being allocated to each one of the K individual transmissions in a considered frame period, the access point: obtains a frequency allocation descriptor F indicating which frequency resource is allocated in the considered frame period to each one of the K individual transmissions; obtains a frequency occurrence descriptor G indicating how many times each candidate frequency resource is used for performing the K individual transmissions in the considered frame period; signals the frequency occurrence descriptor G in said cell; and enables transmitting data for the K individual transmissions in accordance with the frequency allocation descriptor F and a predetermined frequency sequencing rule.

12 Claims, 5 Drawing Sheets

(51) Int. Cl.
*H04L 5/00* (2006.01)
*H04B 1/713* (2011.01)

(52) U.S. Cl.
CPC .......... *H04L 5/0037* (2013.01); *H04L 5/0053* (2013.01); *H04W 72/0406* (2013.01)

(56) References Cited

U.S. PATENT DOCUMENTS

2015/0256403 A1* 9/2015 Li .......................... H04W 4/70
 370/235
2016/0073391 A1* 3/2016 Awad .................... H04L 1/1822
 370/329

* cited by examiner

METHOD FOR SIGNALING TIME AND FREQUENCY RESOURCES ALLOCATION IN WIRELESS COMMUNICATION SYSTEM

TECHNICAL FIELD

The present invention generally relates to signalling time and frequency resources used within a wireless communications network for performing K individual transmissions from an access point to plural mobile terminals.

BACKGROUND ART

In order to perform transmissions within a wireless communications network, resources of the wireless communications network need to be allocated by a device of the wireless communications network in charge of coordinating the resources usage.

Time and frequency resources are typically used to enable performing said transmissions. Time is first divided into frame periods, in which frames are respectively transmitted according to a predefined format. Each frame period comprises time slots of equal size, which thus define time resources. Plural frequencies or frequency bands are available to perform transmissions, which thus define frequency resources. Distinct fields of a single frame can then rely on distinct frequency resources.

Usage of one such frequency or frequency band during one such time slot defines one time and frequency resource. Time and frequency resources are typically represented using a grid, with frequency resources represented on one axis and time resources represented on another axis.

SUMMARY OF INVENTION

Technical Problem

Time and frequency resources allocation shall generally be signalled within the wireless communications network in order, for each device of the wireless communications network, to be able to determine via which time and frequency resources the transmissions are expected to effectively occur. Under many circumstances, a mechanism in charge of signalling has limited capacities, mostly related to the fact that signalling is indicated in a frame field having a limited size that does allow representing any time and frequency resources sequence from amongst all time and frequency resources sequences made possible by the aforementioned grid. For instance, considering a grid of twenty time resources and sixteen frequency resources, and further considering that one transmission occurs per time resource, eighty bits are required to be able to represent any time and frequency resources sequence from amongst all time and frequency resources sequences made possible by the grid (four bits per time resource to represent any frequency resource from amongst all possible frequency resources). When the frame field dedicated to signalling has a size strictly lower than the required eighty bits, only a subset of the time and frequency resources sequences made possible by the grid can therefore be signalled. In a more general approach, it is beneficial to attempt reducing an amount of signalling data transmitted within a wireless communications network.

Solution to Problem

To that end, the present invention concerns a method for performing K individual transmissions between an access point managing a cell of a wireless communications network and plural mobile terminals attached to said access point within said cell, the K individual transmissions being performed via time and frequency resources from amongst a predefined set of candidate time and frequency resources on a per frame period basis, each time and frequency resource being a predefined frequency resource usable over a predefined time resource, one time and frequency resource being allocated to each one of the K individual transmissions in a considered frame period. The method is such that the access point performs: obtaining a first frequency allocation descriptor F indicating which frequency resource is allocated in the considered frame period to each one of the K individual transmissions; obtaining a frequency occurrence descriptor G indicating how many times each candidate frequency resource is used for performing the K individual transmissions in the considered frame period; signalling the frequency occurrence descriptor G in said cell; and enabling transmission of data for the K individual transmissions in accordance with the first frequency allocation descriptor F and a predetermined frequency sequencing rule, the predetermined frequency sequencing rule indicating in which order the candidate frequency resources shall be considered in view of the frequency occurrence descriptor G within the frame periods, and wherein the access point further provides an indication enabling the mobile terminals attached thereto to determine which time resource in the considered frame period is associated with each one of the K individual transmissions. Thus, by signalling the frequency occurrence descriptor G instead of the first frequency allocation descriptor F, signalling overhead is reduced when exp $(1)<L<N$, wherein L is the quantity of candidate frequency resources in the considered frame period.

According to a particular feature, the frequency occurrence descriptor G being composed of L elements $G(j)$ comprising information identifying a quantity $G(j) \cdot Nb$ of occurrences of the frequency resource to which said element refers in the considered frame period, j being an index, signalling the frequency occurrence descriptor G is performed according to a differential bitmapping in which the quantity of occurrences of each frequency resource identified by the index j is represented by the quantity $G(j) \cdot Nb$ of successive bits having one value and in which the representation of the occurrences for one frequency resource identified by the index j is separated from the representation of the occurrences for a following frequency resource identified by the index $j+1$ by a bit having another value. Thus, signalling overhead is further reduced.

According to a particular feature, the access point determines the frequency occurrence descriptor G from the first frequency allocation descriptor F indicating which frequency resource is allocated in the considered frame period to each one of the K individual transmissions.

According to a particular feature, the access point transmits the data for the K individual transmissions further in accordance with a predetermined transmission allocation rule defining in which order the time resources shall be considered in view of the frequency occurrence descriptor G and in view of the frequency sequencing rule within each frame period. Thus, the transmission allocation rule achieves interleaving and therefore provides transmission diversity, and allows limiting interference with adjacent cells.

According to a particular feature, the order in which the time resources shall be considered in view of the frequency occurrence descriptor G and in view of the frequency sequencing rule within each frame period is randomly defined for said cell and wherein the access point provides information representative of the resulting transmission allocation rule to the mobile terminals attached thereto. Thus, defining the transmission allocation rule is simple and interference with adjacent cells is limited.

According to a particular feature, the access point is connected to a server further connected to other access points managing other respective cells, and the server defines such a transmission allocation rule for one said cell and by circularly shifting the order the time resources shall be considered within each other said cell, and wherein the server provides information representative of the resulting transmission allocation rules to the respective access points, and wherein the access point provides said information to the mobile terminals attached thereto. Thus, interference between adjacent cells is further limited.

According to a particular feature, for providing the indication enabling the mobile terminals to determine which time resource in the considered frame period is associated with each one of the K individual transmissions, considering that the considered frame period is dedicated to downlink communications, the access point includes in the data transmitted for each one of the K individual transmissions an identifier representative of said individual transmission. Thus, overhead of transmitting information about said identifier impacts only data of each individual transmission and not the whole system.

According to a particular feature, considering that the K individual transmissions alternate over frame periods between downlink and uplink communications in a predefined manner, the access point includes in the data transmitted for each one of the K individual transmissions of said considered frame period an identifier representative of a time resource to be used for uplink communication of said individual transmission in a subsequent frame period. Thus, time and frequency resource allocation for uplink transmissions is flexible.

According to a particular feature, for providing the indication enabling the mobile terminals to determine which time resource in the considered frame period is associated with each one of the K individual transmissions, the access point performs: signalling in said cell, for each time resource of the considered frame period, whether said time resource is intended to be used for downlink communication or for uplink communication, in association with an identifier representative of the individual transmission to which said time resource is allocated. Thus, time and frequency resource allocation is flexible.

According to a particular feature, for providing the indication enabling the mobile terminals to determine which time resource in the considered frame period is associated with each one of the K individual transmissions, considering that the K individual transmissions alternate over frame periods between downlink and uplink communications in a predefined manner, the access point performs: signalling in said cell, for each time resource of the considered frame period, an identifier representative of the individual transmission to which said time resource is allocated. Thus, time and frequency resource allocation is flexible.

The invention also concerns a method for receiving data of one among K individual transmissions from an access point managing a cell of a wireless communications network to plural mobile terminals attached to said access point within said cell, the K individual transmissions being performed via time and frequency resources from amongst a predefined set of candidate time and frequency resources on a per frame period basis, each time and frequency resource being a predefined frequency resource usable over a predefined time resource, one time and frequency resource being allocated to each one of the K individual transmissions in a considered frame period. The method is such that a mobile terminal that is attached to the access point performs: receiving via signalling a frequency occurrence descriptor G indicating how many times each candidate frequency resource is used for performing the K individual transmissions in the considered frame period; determining, from the received frequency occurrence descriptor G and from a predetermined frequency sequencing rule, a second frequency allocation descriptor F' describing which frequency resource has been allocated for each time resource in sequence of the considered frame period, the predetermined frequency sequencing rule indicating in which order the candidate frequency resources shall be considered in view of the frequency occurrence descriptor G within the frame periods; obtaining from the access point an indication enabling the mobile terminals attached to said access point to determine which time resource in the considered frame period is associated with each one of the K individual transmissions; and receiving data among the K individual transmissions in accordance with the second frequency allocation descriptor F' and further in accordance with the obtained indication. Thus, signalling overhead is reduced when $\exp(1) < L < N$, wherein L is the quantity of candidate frequency resources in the considered frame period, and the mobile terminal is able to receive said data.

According to a particular feature, the mobile terminal determines the second frequency allocation descriptor F' further in accordance with a predetermined transmission allocation rule defining in which order the time resources shall be considered in view of the frequency occurrence descriptor G and in view of the frequency sequencing rule within each frame period. Thus, the transmission allocation rule achieves interleaving and therefore provides transmission diversity, and allows limiting interference with adjacent cells.

The invention also concerns a method for performing K individual transmissions from an access point managing a cell of a wireless communications network to plural mobile terminals attached to said access point within said cell, wherein the access point and each mobile terminal act as aforementioned.

The invention also concerns an access point adapted for performing K individual transmissions between said access point intended to manage a cell of a wireless communications network and plural mobile terminals intended to be attached to said access point within said cell, the K individual transmissions being intended to be performed via time and frequency resources from amongst a predefined set of candidate time and frequency resources on a per frame period basis, each time and frequency resource being a predefined frequency resource usable over a predefined time resource, one time and frequency resource being intended to be allocated to each one of the K individual transmissions in a considered frame period. The access point comprises: means for obtaining a first frequency allocation descriptor F indicating which frequency resource is allocated in the considered frame period to each one of the K individual transmissions; means for obtaining a frequency occurrence descriptor G indicating how many times each candidate frequency resource is used for performing the K individual transmissions in the considered frame period; means for signalling the frequency occurrence descriptor G in said cell; and means for enabling transmission of data for the K individual transmissions in accordance with the first frequency allocation descriptor F and a predetermined frequency sequencing rule, the predetermined frequency sequencing rule indicating in which order the candidate frequency resources shall be considered in view of the frequency occurrence descriptor G within the frame periods. The access point further comprises means for providing an indication enabling the mobile terminals attached thereto to determine which time resource in the considered frame period is associated with each one of the K individual transmission.

The invention also concerns a mobile terminal adapted for receiving data of one among K individual transmissions from an access point managing a cell of a wireless communications network to plural mobile terminals intended to be attached to said access point within said cell, the K individual transmissions being intended to be performed via time and frequency resources from amongst a predefined set of candidate time and frequency resources on a per frame period basis, each time and frequency resource being a predefined frequency resource usable over a predefined time resource, one time and frequency resource being intended to be allocated to each one of the K individual transmissions in a considered frame period. The mobile terminal, which is intended to be attached to the access point, comprises: means for receiving via signalling a frequency occurrence descriptor G indicating how many times each candidate frequency resource is used for performing the K individual transmissions in the considered frame period; means for determining, from the received frequency occurrence descriptor G and from a predetermined frequency sequencing rule, a second frequency allocation descriptor F' describing which frequency resource has been allocated for each time resource in sequence of the considered frame period, the predetermined frequency sequencing rule indicating in which order the candidate frequency resources shall be considered in view of the frequency occurrence descriptor G within the frame periods; means for obtaining from the access point an indication enabling the mobile terminals attached to said access point to determine which time resource in the considered frame period is associated with each one of the K individual transmissions; and means for receiving data for the K individual transmissions in accordance with the second frequency allocation descriptor F' and further in accordance with the obtained indication.

The invention also concerns a system for performing K individual transmissions from an access point managing a cell of a wireless communications network to plural mobile terminals attached to said access point within said cell, wherein the system comprises at least one access point and plural mobile terminals as aforementioned.

The present invention also concerns a computer program that can be downloaded from a communications network and/or stored on a medium that can be read by a processing device. This computer program comprises instructions for causing implementation of the method mentioned above in relation with the access point or of the method mentioned above in relation with the mobile terminal, when said program is run by the processing device. The present invention also concerns information storage means, storing a computer program comprising a set of instructions causing implementation of the method mentioned above in relation with the access point or of the method mentioned above in relation with the mobile terminal, when the stored information is read from said information storage means and run by the processing device.

Since the features related to the access point, to the mobile terminal and to the computer program are similar to those already mentioned with regard to the corresponding aforementioned methods, the corresponding advantages are not repeated here.

The characteristics of the invention will emerge more clearly from a reading of the following description of an example of embodiment, said description being produced with reference to the accompanying drawings.

DESCRIPTION OF EMBODIMENTS

It is considered herein a wireless communications network providing time and frequency resources for performing individual transmissions within the wireless communications network. As already mentioned, time and frequency resources can be represented by a grid on a per frame period basis, with candidate frequency resources being represented on one axis and time resources of a considered frame period being represented on another axis. For each frame period, time and frequency resources allocation that defines which time and frequency resources among the time and frequency resources of the grid have to be used to perform a quantity K of individual transmissions has to be signalled. Individual transmissions means that said transmissions are not correlated to each other, e.g. no constraint on whether one or another of said individual transmissions is performed first within one frame. It is however considered that each one of the K individual transmissions shall be allocated one time and frequency resource per frame period. Time and frequency resources allocation may change from a first frame period to a subsequent second frame period, since the quantity of individual transmissions that are active in said first frame period may differ from the quantity of individual transmissions that are active in said second frame period. Moreover, time and frequency resources allocation may change from the first frame period to the second frame period, since the time and frequency resources allocation may take into account frequency hopping for each one of the K individual transmissions over a predetermined quantity of consecutive frame periods.

It is further considered herein that, over a single frame period, the probability that transmission conditions change is negligible, which means that any time resource in said single frame can be indifferently used for performing one or another one of the K individual transmissions.

Figure 1:
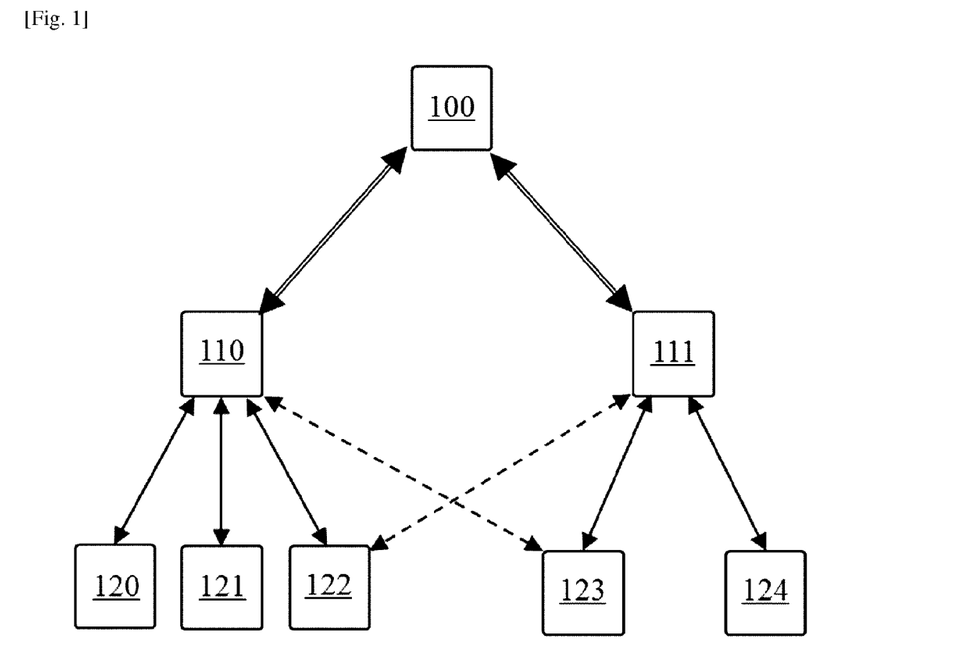
FIG. 1 schematically represents a wireless communications network in which the present invention may be implemented.

FIG. 1 schematically represents a wireless communications network in which the present invention may be implemented.

The wireless communications network shown in FIG. 1 comprises at least one access point AP and plural mobile terminals. The wireless communications network preferably comprises plural APs. Two APs 110, 111 are illustratively represented in FIG. 1. Each mobile terminal is attached to one AP according to its geographical location, i.e. accesses services of the wireless communications network via the AP to which said mobile terminal is attached. In FIG. 1, it is illustratively represented that three mobile terminals 120, 121, 122 are attached to the AP 110 and two mobile terminals 123, 124 are attached to the AP 111. The wireless communications network is active over land areas referred to as cells. Each AP of the wireless communications network manages a cell allowing mobile terminals present in the land area of the cell to benefit from the services of the wireless communications network via the AP managing the cell, i.e. to which said mobile terminals are attached.

Therefore, in FIG. 1, the mobile terminals 120, 121, 122 communicate within the wireless communications network via the AP 110, and the mobile terminals 123, 124 communicate within the wireless communications network via the AP 111, as represented by solid line arrows in FIG. 1. The wireless communications network preferably further comprises a server 100 connected to each AP in order to allow implementing the services of the wireless communications network.

It is further represented in FIG. 1 that, from the standpoint of the mobile terminal 123, downlink and/or uplink communications between the AP 110 and the mobile terminal 122 may interfere with the downlink and/or uplink communications between the AP 111 and the mobile terminal 123. From the standpoint of the mobile terminal 122, downlink and/or uplink communications between the AP 111 and the mobile terminal 123 may interfere with the downlink and/or uplink communications from the AP 110 and the mobile terminal 122. Such interference is represented in FIG. 1 by dashed line arrows. Other interference not relative to downlink and/or uplink communications in the wireless communications network may occur due to presence of external interferers located in the vicinity of the mobile terminals and/or in the vicinity of the APs. Coping with such interference, or noise or path loss, can be performed thanks to frequency hopping when allocating time and frequency resources for transmissions. Frequency hopping provides diversity in terms of frequency resources usage, which allows the transmissions to be robust to narrowband interference.

The expression "downlink communications" refers herein, as typically understood by the one skilled in the art, to communications from a considered access point to a considered mobile terminal. The expression "uplink communications" refer herein, as typically understood by the one skilled in the art, to communications from a considered mobile terminal to a considered access point.

The server 100 is in charge of performing time and frequency resources allocations within the wireless communications network. To achieve this, the server 100 communicates with the APs 110, 111 so as to receive and process allocation requests. In a variant, the allocations of time and frequency resources are not performed by the server 100, but by the APs 110, 111 themselves.

A device, i.e. an AP or the server 100, in charge of performing time and frequency resources allocations within the wireless communications network may be referred to as managing device.

Transmissions between the APs and the mobile terminals respectively attached thereto are considered as individual transmissions, i.e. uncorrelated transmissions.

In an illustrative manner, the mobile terminals considered herein may be communication devices installed in trains performing journeys on railroads on the edge of which the APs 110, 111 are located.

Figure 2:
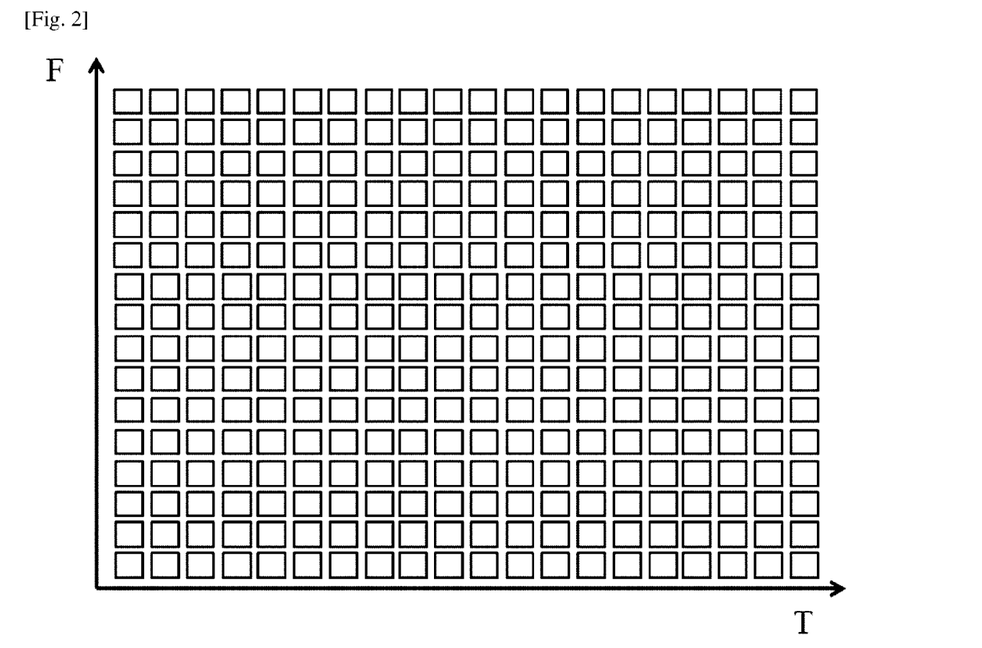
FIG. 2 schematically represents a grid of time and frequency resources of the wireless communications network, the grid representing a set of candidate frequency resources for a set of time resources of a considered frame period.

As already mentioned, the time and frequency resources that may be used for performing transmissions between the AP 110 and the mobile terminals 120, 121, 122, and transmissions between the AP 111 and the mobile terminals 123, 124 can be represented on a per frame period basis using a grid of time and frequency resources, as illustratively represented in FIG. 2. Said transmissions can therefore be downlink and/or uplink communications.

In FIG. 2, the candidate frequency resources are represented as ordinates (vertical axis) and the time resources of a considered frame period are represented as abscissa (horizontal axis). Illustratively, the frequency band from 2400 MHz to 2480 MHz is divided into sixteen frequency resources of 5 MHz each. In other words, each row of the grid shown in FIG. 2 represents a 5 MHz wide frequency resource. Time is divided into frame periods, themselves illustratively containing time resources, also referred to as time slots, of 4 ms each. Twenty time resources are represented by the grid shown in FIG. 2. In other words, each column of the grid shown in FIG. 2 represents a 4 ms wide time resource. Each square represented in the grid of FIG. 2 therefore corresponds to a time and frequency resource of 5 MHz over 4 ms.

The K individual transmissions shall be performed using time and frequency resources of said grid on a per frame period basis. Signalling information has to be transmitted from the APs to the mobile terminals attached thereto in order to indicate the time and frequency resources to be used for downlink and/or uplink communications in each frame, so that said mobile terminals are able to determine which time and frequency resources of the grid are used during said frame period.

A part of the frame period in which signalling information is provided is typically of limited size, which therefore reduces the quantity of allowable frequency hopping sequences compared with an exhaustive quantity of frequency hopping sequences made possible by the grid. In another approach, reducing the size of the signalling information is beneficial to the resources consumption in the wireless communications network, since resources non used for said signalling can be used for transmitting other information.

The grid of time and frequency resources shown in FIG. 2 doesn't show time periods of the frame periods that may be used for transmitting signalling information. In a particular embodiment, the frame period includes a predefined time period dedicated to broadcast information, such as signalling information; such a predefined time period is referred to as broadcast channel (BCH).

In a preferred embodiment, the aforementioned broadcast channel BCH is used to provide signalling information to be effectively applied for the frame period in which said signalling information is transmitted. The broadcast channel BCH is therefore located prior to the time resources used for performing the K individual transmissions. In a variant, the broadcast channel BCH is used to provide signalling information to be effectively applied for a frame period later than the one in which said signalling information is transmitted. The broadcast channel BCH can therefore be located elsewhere inside the frame period.

Figure 3:
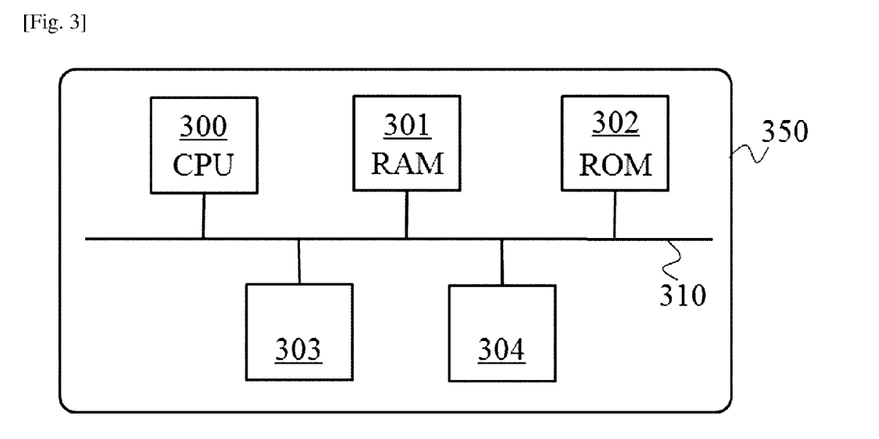
FIG. 3 schematically represents a hardware architecture of a communication device of the wireless communications network.

FIG. 3 schematically represents a communication device 350 of the wireless communications network. The communication device 350 may be a representation of an AP, such as the AP 110, and/or may be a representation of a mobile terminal, such as the mobile terminal 120, and/or may be a representation of the server 100.

According to the shown architecture, the communication device 350 comprises the following components interconnected by a communications bus 310: a processor, microprocessor, microcontroller or CPU (Central Processing Unit) 300; a RAM (Random-Access Memory) 301; a ROM (Read-Only Memory) 302; an HDD (Hard-Disk Drive) or an SD (Secure Digital) card reader 303, or any other device adapted to read information stored on storage means; and, a set of at least one communication interface 304.

The set of at least one communication interface 304 allows the communication device to communicate with at least one other communication device of the wireless communications network.

CPU 300 is capable of executing instructions loaded into RAM 301 from ROM 302 or from an external memory, such as an SD card. After the communication device 350 has been powered on, CPU 300 is capable of reading instructions from RAM 301 and executing these instructions. The instructions form one computer program that causes CPU 300, and thus the communication device 350, to perform some or all of the steps of the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 4:
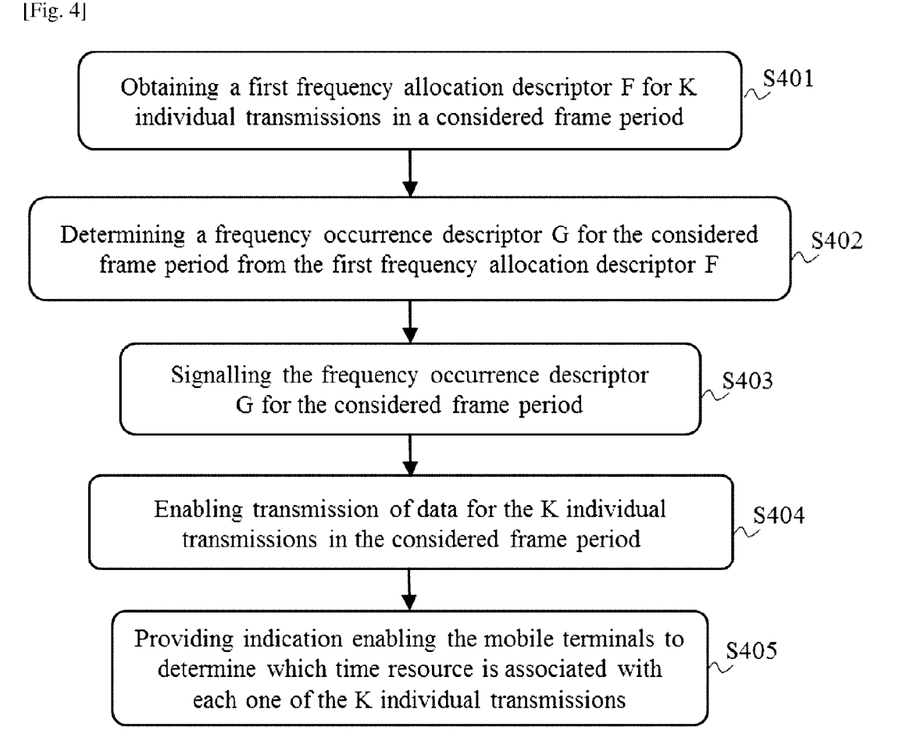
FIG. 4 schematically represents an algorithm, performed by at least one access point of the wireless communications network, for transmitting data to mobile terminals attached to said access point and/or receiving data from said mobile terminals.

FIG. 4 schematically represents an algorithm, performed by at least one AP of the wireless communications network, for transmitting data to a plurality of mobile terminals in the wireless communications network. Let's consider that the algorithm of FIG. 4 is performed by the AP 110. The algorithm of FIG. 4 is preferably performed by any and all APs of the wireless communications network.

Let's consider that the grid of time and frequency resources comprises, on a per frame period basis, a quantity L of plural candidate frequency resources and a quantity N of plural time resources. Let's further consider that the AP 110 intends to transmit data, on a per frame basis, in the scope of a quantity K individual transmissions, such that K≤N. It is further considered that, in a single frame period, the probability that transmission conditions change is negligible, i.e. the effective time resource used for performing any individual transmission during said single frame period does not a priori impact the transmission performance.

In a step S401, the AP 110 obtains a first frequency allocation descriptor F describing, for each one of the K individual transmissions, which frequency resource is allocated for transmitting data between the AP 110 and the mobile terminals attached thereto in a considered frame period. The first frequency allocation descriptor F may be determined by the AP 110, e.g. in order to achieve frequency hopping for each one of the mobile terminal over successive frames. The first frequency allocation descriptor F may be determined by the server 100, e.g. in order to achieve frequency hopping for each one of the K individual transmissions over successive frame periods, and the first frequency allocation descriptor F is then transmitted by the server 100 to the AP 110. Frequency allocation may be performed according to another policy than frequency hopping, e.g. to ensure that frequency resources usage over successive frames is fairly distributed among all candidate frequency resources.

The first frequency allocation descriptor F is therefore composed of K elements F(i), wherein i is in this case an index that can take values from 1 to K used for identifying which one of the K individual transmissions is considered. The value of i is therefore representative of one individual transmission among the K individual transmissions. Each element F(i) of the first frequency allocation descriptor F comprises information, denoted F(i)·f_ID, identifying the frequency resource allocated to the individual transmission identified by the index i. Said information F(i)·f_ID is a value of an index j, that can take values from 1 to L, used for identifying one frequency resource among the L candidate frequency resources.

In a step S402, the AP 110 determines, from the first frequency allocation descriptor F, a frequency occurrence descriptor G describing, for each candidate frequency resource, how many times said candidate frequency resource is used in the considered frame period. The frequency occurrence descriptor G is therefore composed of L elements G(j). Each element G(j) of the frequency occurrence descriptor G comprises information, denoted G(j)·Nb, identifying the quantity of occurrences of the frequency resource identified by the index j in the considered frame period.

In a variant, the server 100 determines the frequency occurrence descriptor G from the first frequency allocation descriptor F, and then transmits the frequency occurrence descriptor G to the AP 110.

Figure 7:
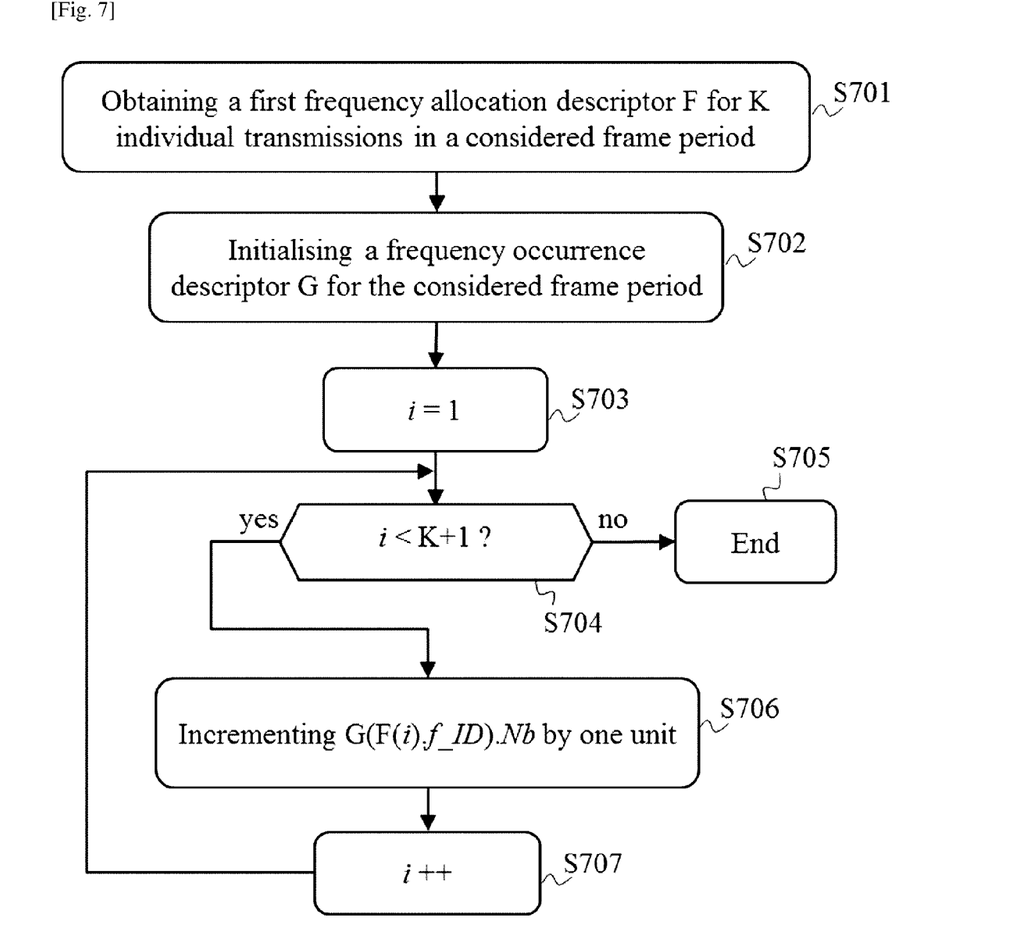
FIG. 7 schematically represents an algorithm, performed by at least one access point of the wireless communications network, for determining contents of a frequency occurrence descriptor.

An embodiment for determining the frequency occurrence descriptor G from the first frequency allocation descriptor F is detailed hereafter with regard to FIG. 7.

In a step S403, the AP 110 transmits to the mobile terminals 120, 121, 122 attached thereto signalling information in order to transmit the frequency occurrence descriptor G to said mobile terminals 120, 121, 122. The AP 110 transmits the signalling information timely before the time and frequency resources of the concerned frame period which are relative to said frequency occurrence descriptor G. Signalling information transmitted by the AP 110 may comprise other information than the frequency occurrence descriptor G. An illustrative embodiment relying on the aforementioned broadcast channel BCH is detailed hereafter with regard to FIG. 5.

In a step S404, the AP 110 enables transmitting, in the considered frame period, data for each one of the K individual transmissions, according to the first frequency allocation descriptor F and according to a predetermined frequency sequencing rule. The frequency sequencing rule defines in which order the candidate frequency resources shall be considered in view of the frequency occurrence descriptor G within the frame periods. For downlink communications, the AP 110 transmits in the considered time and frequency resource, data for the considered individual transmission to which said time and frequency resource correspond according to the first frequency allocation descriptor F and to the predetermined frequency sequencing rule. For uplink communications, the AP 110 expects receiving in the considered time and frequency resource, data for the considered individual transmission to which said time and frequency resource correspond according to the first frequency allocation descriptor F and to the predetermined frequency sequencing rule.

According to a first illustrative example, said frequency sequencing rule defines that the AP 110 shall use all occurrences of the candidate frequency resources (effectively indicated in the frequency occurrence descriptor G) in increasing order of the index j (i.e. all occurrences G(1) of the frequency resource identified by the index value "1" if any, then all occurrences G(2) of the frequency resource identified by the index value "2" if any, and so on).

According to a second illustrative example, said frequency sequencing rule defines that the AP 110 shall cyclically use the occurrences of the candidate frequency resources (effectively indicated in the frequency occurrence descriptor G) in increasing order of the index j (i.e. one occurrence G(1) of the frequency resource identified by the index value "1" if any, then one occurrence G(2) of the frequency resource identified by the index value "2" if any, and so on up to the frequency resource identified by the index value equal to L, and then restart a cycle with the frequency resource identified by the index value "1" if any, and so on).

Any other kind of frequency sequencing rule for sequencing the candidate frequency resource usage can be defined.

The frequency sequencing rule may be predefined, e.g. during manufacturing or initialisation. In a variant, the frequency sequencing rule is determined by the AP 110 and information representative thereof is provided by the AP 110 to the mobile terminals 120, 121, 122 attached thereto for further application over successive frame periods. In another variant, the frequency sequencing rule is defined by the server 100 and information representative thereof is provided to the AP 110 that then provides said information to the mobile terminals 120, 121, 122 attached thereto. In case the frequency sequencing rule is dynamically defined, transmitting information representative of the frequency sequencing rule occurs significantly less often than signalling the frequency occurrence descriptor G. Indeed, the frequency sequencing rule is intended to be quite stable over time (although some change may appear from time to time), whereas the frequency occurrence descriptor G is intended to change on a per frame period basis.

In a particular embodiment, the AP 110 enables transmitting, in the considered frame period, said data for each one of the K individual transmissions, further according to a predetermined transmission allocation rule. The transmission allocation rule defines in which order the time resources shall be considered in view of the frequency occurrence descriptor G and in view of the frequency sequencing rule, within each frame period.

The transmission allocation rule can be represented by a transmission allocation descriptor TA, indicating in which order the time resources shall be considered in view of the frequency occurrence descriptor G and in view of the frequency sequencing rule. The transmission allocation descriptor TA is therefore composed of N elements TA(k), wherein k is in this case an index that can take values from 1 to N. Each element TA(k) of the transmission allocation descriptor TA comprises information, denoted TA(k)·t_ID, identifying the time resource allocated to be considered at the k-th position in sequence in a considered frame period (each time resource appearing only once). As an illustrative example, considering a frame period of four time resources, a transmission allocation descriptor TA such that TA(1)·t_ID=3, TA(2)·t_ID=1, TA(1)·t_ID=2 and TA(4)·t_ID=4, means that the third time resource in sequence is considered first, then the first time resource in sequence is considered, then the second time resource in sequence is considered and then the fourth time resource in sequence is considered.

The definition of the transmission allocation rule is particularly useful for reducing potential interferences between adjacent cells of the wireless communications network, e.g. interferences undergone by a mobile terminal attached to a first AP of the wireless communications network due to signals transmitted by a second AP of the wireless communications network. Indeed, respectively defining distinct transmission allocation rules for adjacent cells reduces potential interferences between adjacent cells. Therefore, according to a first particular embodiment, each AP randomly defines the transmission allocation rule to be applied within the cell managed by said AP. In a variant, the server 100 randomly defines the transmission allocation rules to be respectively applied by the APs of the wireless communications network and provides the randomly defined transmission allocation rules to the respective APs for further application. According to a second particular embodiment, the server 100 determines the transmission allocation rules to be respectively applied within a quantity C of adjacent cells by defining the transmission allocation rule for one said cell and by circularly shifting the order the time resources shall be considered within each other said cell. For instance, the server 100 defines the order of the time resources in circular increasing order of the index k from c·floor(N/C) to (c·floor(N/C))−1, wherein c is an index that can take values from 1 to C used for identifying which one of the cell is considered among the C adjacent cells.

The transmission allocation rule may be predefined, e.g. during manufacturing or initialisation. In a variant, the transmission allocation rule is determined by the AP 110 and information representative thereof is provided by the AP 110 to the mobile terminals 120, 121, 122 attached thereto for further application over successive frame periods. In another variant, the transmission allocation rule is defined by the server 100 and information representative thereof is provided to the AP 110 that then provides said information to the mobile terminals attached thereto. In case the transmission allocation rule is dynamically defined, signalling information representative of the transmission allocation rule occurs significantly less often than signalling the frequency occurrence descriptor G. Indeed, the transmission allocation rule is intended to be quite stable over time (although some change may appear from time to time), whereas the frequency occurrence descriptor G is intended to change on a per frame period basis.

In a step S405, the AP 110 provides indication enabling the mobile terminals attached thereto to determine which time resource is associated with each one of the K individual transmissions. Said indication is therefore defined according to the first frequency allocation descriptor F and according to the predetermined frequency sequencing rule, and, optionally, further according to the transmission allocation rule. It allows each mobile terminal 120, 121, 122 attached to the AP 110 to determine whether said data are addressed to said mobile terminal or to another mobile terminal attached to the AP 110, as detailed hereafter with regard to FIG. 6.

According to a first embodiment, for providing the indication enabling the mobile terminals to determine which time resource in the considered frame period is associated with each one of the K individual transmissions, considering that the considered frame period is dedicated to downlink communications, the AP 110 includes in the data transmitted for each one of the K individual transmissions an identifier representative of said individual transmission. Thus, the data transmitted in each time resource of the considered frame period by the AP 110 comprise an identifier relative to the concerned individual transmission among the K individual transmissions, i.e. typically an identifier of the mobile terminal to which said data is effectively addressed when one individual transmission exists per mobile terminal.

According to a second embodiment, considering that the K individual transmissions alternate over frame periods between downlink and uplink communications in a predefined manner (e.g. one frame period is dedicated to downlink communications, the immediately following frame period is dedicated to uplink communications, and so on), the access point includes in the data transmitted for each downlink communication among the K individual transmissions an identifier representative of said individual transmission and further includes in said data of said considered frame period an identifier representative of a time resource to be used for uplink communication of said individual transmission in a subsequent frame period. Therefore, each mobile terminal attached to the AP 110 and concerned by one individual transmission among said K individual transmissions is able to identify in the downlink communication data which time resource to be used in the subsequent frame period for transmitting the uplink communication data of said individual transmission. The frequency occurrence descriptor G transmitted as signalling information in said subsequent frame period therefore applies to said uplink communications.

According to a third embodiment, for providing the indication enabling the mobile terminals to determine which time resource in the considered frame period is associated with each one of the K individual transmissions, the AP 110 transmits signalling information indicating, for each time resource of the considered frame period, whether said time resource is intended to be used for downlink communication or for uplink communication, in association with an identifier representative of the individual transmission among the K individual transmissions to which said time resource is allocated. The signalling information therefore includes N elements for this purpose, each element including the identifier representative of the individual transmission among the K individual transmissions to which the time resource that the element refers is allocated, as well as an indication indicating whether said time resource is intended for downlink communication or for uplink communication.

In a variant, two frequency occurrence descriptors, such as the aforementioned frequency occurrence descriptor G, can respectively be used for downlink communications and for uplink communications in the signalling of the considered frame period.

According to a fourth embodiment, for providing the indication enabling the mobile terminals to determine which time resource in the considered frame period is associated with each one of the K individual transmissions, considering that the K individual transmissions alternate over frame periods between downlink and uplink communications in a predefined manner (e.g. one frame period is dedicated to downlink communications, the immediately following frame period is dedicated to uplink communications, and so on), the AP 110 transmits signalling information indicating, for each time resource of the considered frame period, an identifier representative of the individual transmission to which said time resource is allocated. The signalling information therefore includes N elements for this purpose, each element including the identifier representative of the individual transmission among the K individual transmissions to which the time resource that the element refers is allocated. Therefore, for a considered frame period, each mobile terminal attached to the AP 110 is able to know whether said frame period is dedicated to downlink communications or to uplink communications, since the K individual transmissions alternate over frame periods between downlink and uplink communications in a predefined manner. Then, thanks to the signalling information, each mobile terminal attached to the AP 110 is able to know which time resource is dedicated to which one of the K individual transmissions.

From what precedes, it can be noted that, by signalling the frequency occurrence descriptor G, instead of the first frequency allocation descriptor F, signalling is reduced when exp (1)<L<N.

In a particular embodiment, the frequency occurrence descriptor G is encoded by using a differential bitmapping in which the quantity of occurrences $G(j) \cdot Nb$ of each frequency resource identified by an index j is represented by the quantity $G(j) \cdot Nb$ of successive bits having the value "0" and in which the representation of the occurrences for one frequency resource identified by the index j is separated from the representation of the occurrences for a following frequency resource identified by the index j+1 by a bit having the value "1". For illustrative considerations, a frequency occurrence descriptor G for four candidate frequency resources over seven time resources such that $G(1) \cdot Nb=1$, $G(2) \cdot Nb=0$, $G(3) \cdot Nb=3$ and $G(4) \cdot Nb=3$ is represented as follows: 0110001000. This approach therefore requires N+L−1 bits. It can be noted that usage of the bit values "0" and "1" may be inverted.

Figure 5:
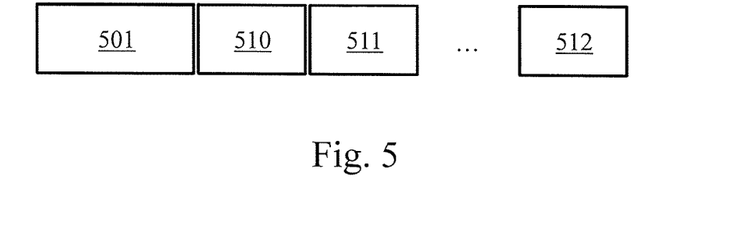
FIG. 5 schematically represents a format of a frame used within the wireless communications network for enabling an access point of the wireless communications network to transmit data to mobile terminals attached to said access point and/or to receive data from said mobile terminals.

FIG. 5 schematically represents a format of a frame for transmitting data between an AP, such as the AP 110, and the plurality of mobile terminals attached thereto.

In each frame period, a frame according to the format shown in FIG. 5 is transmitted by each AP of the wireless communications network.

The format of the frame is such that the frame starts with a first field 501 dedicated to signalling information. The first field 501 is intended to contain the broadcast channel BCH data, and more particularly at least the frequency occurrence descriptor G. In a preferred embodiment, the frequency occurrence descriptor G applies to the frame in which said frequency occurrence descriptor G is inserted. The frequency occurrence descriptor G may, in a variant, apply to a subsequent frame. The first field 501 is transmitted over at least one predefined frequency that is also known by each mobile terminal attached to the considered AP. The first field 501 is intended to be received by each mobile terminal attached to the AP transmitting said first field 501, since said first field 501 contains signalling information (broadcast mode). Said AP therefore applies adequate modulation and coding scheme in order to limit risks that the first field 501 be not received by one or more mobile terminals attached to said AP.

The format of the frame is such that the frame continues with a set of payload fields 510, 511, 512. Each payload field 510, 511, 512 has a duration that corresponds to a time resource according to the aforementioned grid of time and frequency resources. One payload field is present in the frame for each time resource used in the considered frame period. The length of the frame therefore depends on the quantity of individual transmissions that have to be performed in the considered frame period, i.e. K payload fields are present in a considered frame, one payload field for each one of the K individual transmissions.

In the first embodiment mentioned above with regard to FIG. 4, considering that the considered frame period is dedicated to downlink communications, in order to allow each mobile terminal attached to the considered AP to determine whether data contained in any payload field is addressed to said mobile terminal, each payload field 510, 511, 512 contains an identifier of the concerned individual transmission among the K individual transmissions.

In the second embodiment mentioned above with regard to FIG. 4, considering that the K individual transmissions alternate over frame periods between downlink and uplink communications in a predefined manner, each payload field 510, 511, 512 that is dedicated to a downlink communication among the K individual transmissions includes an identifier representative of said individual transmission and further includes an identifier representative of a time resource to be used for uplink communication of said individual transmission in a subsequent frame period.

In the third embodiment mentioned above with regard to FIG. 4, the first field 501 contains signalling information indicating, for each time resource of the considered frame period, whether said time resource is intended to be used for downlink communication or for uplink communication, in association with an identifier representative of the individual transmission among the K individual transmissions to which said time resource is allocated. Considering N time resources per frame period, the signalling information therefore includes N elements for this purpose, each element including the identifier representative of the individual transmission among the K individual transmissions to which the time resource that the element refers is allocated, as well as an indication (typically one bit) indicating whether said time resource is intended for downlink communication or for uplink communication.

In the fourth embodiment mentioned above with regard to FIG. 4, considering that the K individual transmissions alternate over frame periods between downlink and uplink communications in a predefined manner, the first field 501 contains signalling information indicating, for each time resource of the considered frame period, an identifier representative of the individual transmission to which said time resource is allocated. Considering that N time resources exist per frame period, the signalling information therefore includes N elements for this purpose, each element including the identifier representative of the individual transmission among the K individual transmissions to which the time resource that the element refers is allocated.

The payload fields 510, 511, 512 are transmitted, either by the AP having transmitted the first field 501 (downlink communications) or by mobile terminals attached thereto (uplink communications, over respective frequency resources, which may change from one payload field to another in a single frame).

Figure 6:
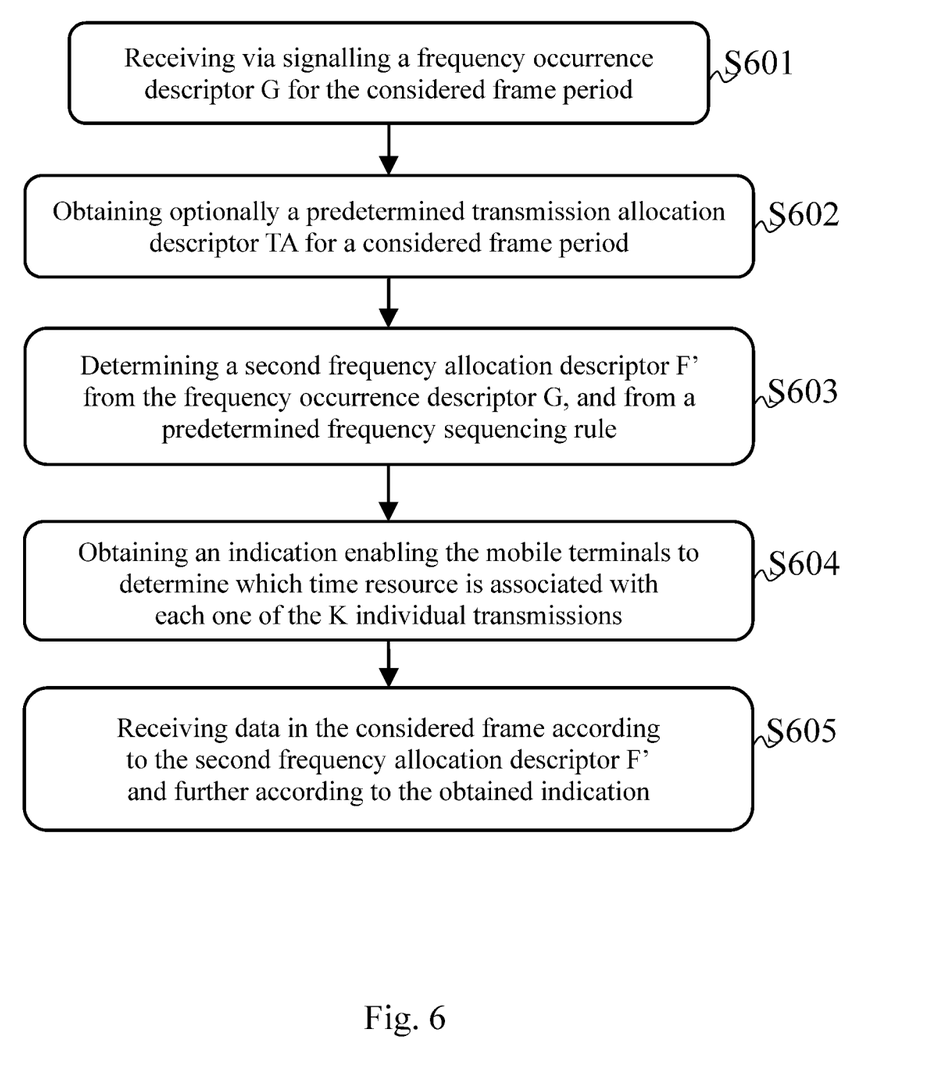
FIG. 6 schematically represents an algorithm, performed by each mobile terminal attached to an access point of the wireless communications network, for receiving data from said access point and/or transmitting data to said access point.

FIG. 6 schematically represents an algorithm, performed by each mobile terminal attached to an AP, for receiving data from said AP (downlink communications) and/or transmitting data to said AP (uplink communications) in the scope of the K individual transmissions. The algorithm of FIG. 6 is performed in conjunction with the algorithm of FIG. 4. Let's illustratively consider that the algorithm of FIG. 6 is performed by the mobile terminal 122 attached to the AP 110 that has performed the algorithm of FIG. 4.

In a step S601, the mobile terminal 122 receives via signalling, from the AP 110, a frequency occurrence descriptor G for a considered frame period, as transmitted by the AP 110 in the step S403. Other signalling information may be received by the mobile terminal 122 from the AP 110, potentially information enabling the mobile terminal 122 to determine which time resource in the considered frame period is associated with each one of the K individual transmissions.

In an optional step S602, the mobile terminal 122 obtains information representative of the transmission allocation rule, such as the aforementioned transmission allocation descriptor TA, applicable for the considered frame period. As already mentioned, the transmission allocation rule may be predefined, e.g. during manufacturing or initialisation. In a variant, information representative of the transmission allocation rule is provided by the AP 110 for further application over successive frame periods.

In a step S603, the mobile terminal 122 determines a second frequency allocation descriptor F' from the frequency occurrence descriptor G and from the frequency resources sequencing rule applicable for the considered frame period. As already mentioned, the frequency resources sequencing rule may be predefined, e.g. during manufacturing or initialisation. In a variant, information representative of the frequency resources sequencing rule is provided by the AP 110 for further application over successive frame periods.

The second frequency allocation descriptor F' describes which frequency resource has been allocated for each time resource in sequence of the considered frame period. Considering that N time resources exist per frame period, the second frequency allocation descriptor F' is therefore composed of N elements F' (k), wherein it is recalled that k is an index that can take values from 1 to N used for identifying which one of the N time resources is considered within the considered frame period. Each element F' (k) of the second frequency allocation descriptor F' comprises information, denoted F'(k)·f_ID, identifying the frequency resource allocated for the time resource identified by the index k. Said information F'(k)·f_ID is a value of the index j, that can take values from 1 to L, used for identifying one frequency resource among the L candidate frequency resources.

The second frequency allocation descriptor F' determined by the mobile terminal 122 in the step S603 therefore differs from the first frequency allocation descriptor F obtained by the AP 110 in the step S401. The first frequency allocation descriptor F obtained by the AP 110 in the step S401 describes, for each one of the K individual transmissions, which frequency resource is allocated for transmitting data of said individual transmission in the considered frame period. The second frequency allocation descriptor F' describes, for each time resource of the considered frame period, which frequency resource is allocated for transmitting data in the scope of the K individual transmissions considered as a whole.

In a particular embodiment, the mobile terminal 122 determines the second frequency allocation descriptor F' further according to the information representative of the transmission allocation rule in the form of the transmission allocation descriptor TA. An embodiment for determining the second frequency allocation descriptor F' from the frequency occurrence descriptor G, and from the frequency resources sequencing rule applicable for the considered frame period, and from the transmission allocation descriptor TA, is detailed hereafter with regard to FIG. 8.

In a step S604, the mobile terminal 122 obtains from the AP 110 an indication enabling the mobile terminals attached to said AP 110 to determine which time resource in the considered frame period is associated with each one of the K individual transmissions.

In the first embodiment mentioned above with regard to FIG. 4, considering that the considered frame period is dedicated to downlink communications, the mobile terminal 122 has to check which identifier is indicated in each payload field of the transmitted frame in order to determine to which one of the K individual transmissions the data contained in said payload field correspond.

In the second embodiment mentioned above with regard to FIG. 4, considering that the K individual transmissions alternate over frame periods between downlink and uplink communications in a predefined manner, the mobile terminal 122 has to check which identifier is indicated in each downlink communications payload field of the transmitted frame in order to determine to which one of the K individual transmissions the data contained in said payload field correspond, and the mobile terminal 122 has to identify in said downlink communications payload field which time resource to be used in a subsequent frame period for transmitting the uplink communication data of said individual transmission.

In the third embodiment mentioned above with regard to FIG. 4, the mobile terminal 122 has to check the signalling information for the considered frame period to determine which time resource is allocated to which individual transmissions among the K individual transmissions and to determine whether said time resource is intended to be used for downlink communications or for uplink communications.

In the fourth embodiment mentioned above with regard to FIG. 4, considering that the K individual transmissions alternate over frame periods between downlink and uplink communications in a predefined manner, the mobile terminal 122 has to determine whether the frame period concerns downlink communications or uplink communications, and has to check the signalling information for the considered frame period to determine which time resource is allocated to which individual transmissions among the K individual transmissions.

In a step S605, the mobile terminal 122 receives data within the frame period to which applies the frequency occurrence descriptor G received via signalling in the step S602. To do so, the mobile terminal 122 relies on the second frequency allocation descriptor F' determined in the step S603 and on the indication obtained in the step S604.

For downlink communications of an individual transmission concerning the mobile terminal 122 during a time resource, the mobile terminal 122 configures a wireless receive interface of said mobile terminal 122 such that said wireless receive interface captures signals transmitted via the frequency resource identified by the information F'(k)·f_ID, wherein the value of the index k identifies said time resource.

For downlink communications for which the mobile terminal 122 doesn't know without interpreting the data payload fields of the frame to which one of the K individual transmissions said data correspond (as in the first embodiment mentioned above), the mobile terminal 122 configures, for each time resource identified by the index k in the considered frame period, said wireless receive interface such that said wireless receive interface captures signals transmitted via the frequency resource identified by the information F'(k)·f_ID. The mobile terminal 122 then filters the downlink communications data of the K individual transmissions by comparing the identifier indicated in each captured payload field of the frame, and intended to indicate the concerned individual transmission among the K individual transmissions, with the identifier of each individual transmission involving said mobile terminal 122. The mobile terminal 122 therefore keeps and processes the data contained in each payload field containing the identifier of one individual transmission involving said mobile terminal 122 and withdraws the data contained in each payload field not containing the identifier of one individual transmission involving said mobile terminal 122.

For uplink communications of an individual transmission concerning the mobile terminal 122 during a time resource, the mobile terminal 122 configures a wireless transmit interface of said mobile terminal 122 such that said wireless transmit interface transmits signals via the frequency resource identified by the information F'(k)·f_ID, wherein the value of the index k identifies said time resource.

FIG. 7 schematically represents an algorithm, performed by at least one AP of the wireless communications network for determining contents of the frequency occurrence descriptor G. The algorithm of FIG. 7 provides details about a particular embodiment of the step S402. Let's illustratively consider that the algorithm of FIG. 7 is performed by the AP 110.

In a step S701, the AP 110 obtains a first frequency allocation descriptor F=(F(1), . . . , F(K)) describing, for each one of the K individual transmissions in the considered frame period, which frequency resource is allocated for transmitting data in the considered frame.

In a step S702, the AP 110 initialises a frequency occurrence descriptor G=(G(1), . . . , G(L)) intended to describe, for each candidate frequency resource, how many times said candidate frequency resource appears in the first frequency allocation descriptor F, i.e. how many times said candidate frequency resource is used in the considered frame period. In the step S702, the frequency occurrence descriptor G is initialised such that the information G(j)·Nb of each one of the L elements G(j) of the frequency occurrence descriptor G equal to the value "0".

In a step S703, the AP 110 initialises the index i to the value "1".

In a step S704, the AP 110 checks whether the actual value of the index i is or not less than K+1. When the actual value of the index i is not less than K+1, which means that the whole first frequency allocation descriptor F has been parsed, the algorithm ends in a step S705; otherwise, a step S706 is performed.

In the step S706, the AP 110 increments by one unit the information G(F(i)·f_ID)·Nb of the frequency occurrence descriptor G, i.e. the information G(j)·Nb that is associated with the frequency resource identified by F(i)·f_ID.

In a step S707, the AP 110 increments by one unit the index i in order to consider, in the determination of the frequency occurrence descriptor G, another one of the K individual transmissions, if any.

Once the algorithm of FIG. 7 ends, the AP 110 is thus aware of how many times each candidate frequency resource is used in the considered frame period.

Figure 8:
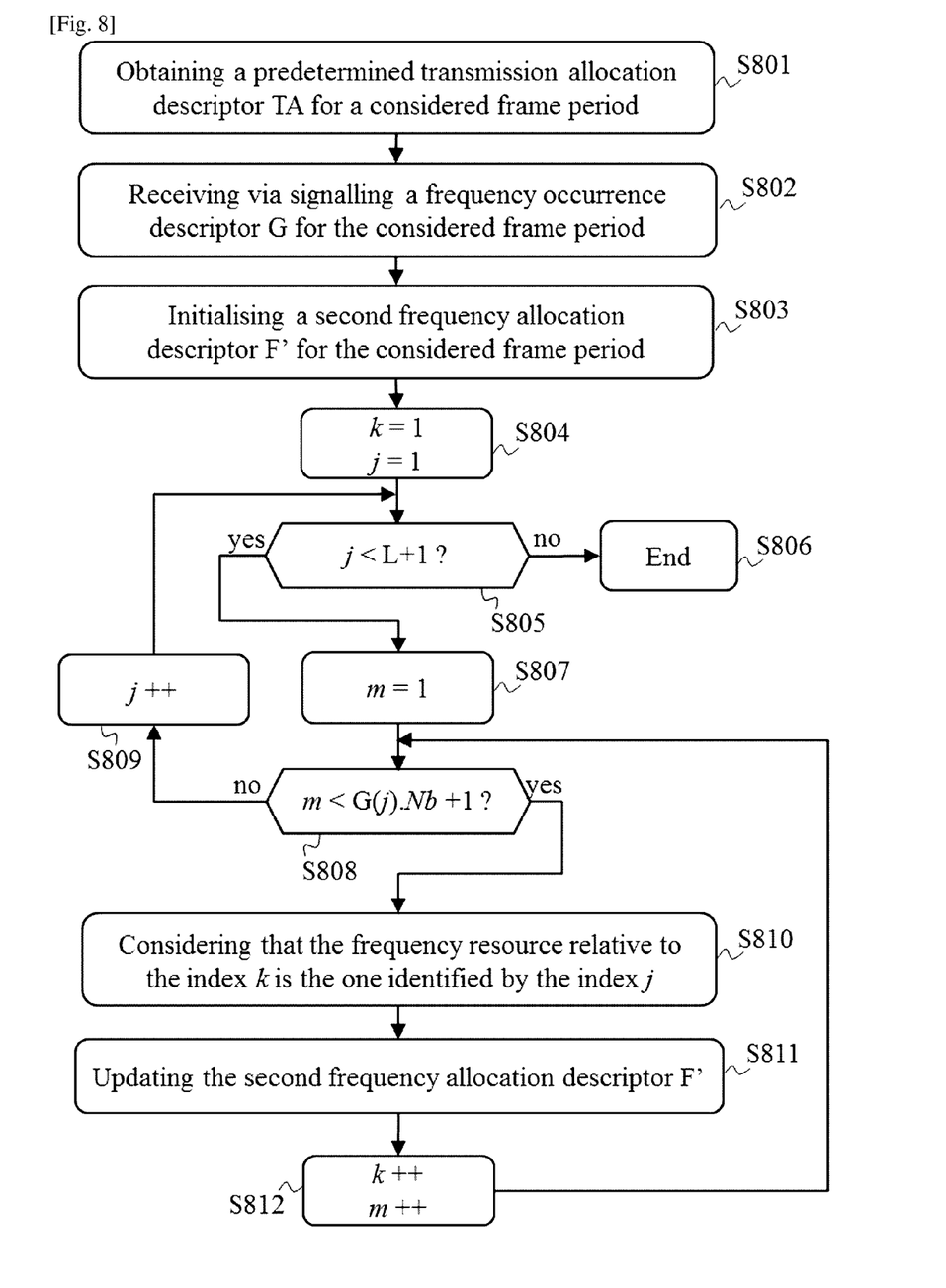
FIG. 8 schematically represents an algorithm, performed by each mobile terminal attached to an access point of the wireless communications network, for determining, from a frequency occurrence descriptor, time and frequency resources used by said access point for transmitting data.

FIG. 8 schematically represents an algorithm, performed by each mobile terminal attached to an AP, for determining from a frequency occurrence descriptor time and frequency resources used within a considered frame for the K individual transmissions considered as a whole. The algorithm of FIG. 8 provides details of a particular embodiment of the step S603. Let's illustratively consider that the algorithm of FIG. 8 is performed by the mobile terminal 122 attached to the AP 110.

In a step S801, the mobile terminal 122 optionally obtains information representative of the predetermined transmission allocation rule, such as the transmission allocation descriptor TA, applicable to the considered frame period. By default when no transmission allocation rule is particularly defined, the time resources are considered in order of appearance in the frame period.

In a step S802, the mobile terminal 122 receives via signalling, from the AP 110, a frequency occurrence descriptor G=(G(1), . . . , G(L)) for the considered frame period. The step S802 corresponds to the step S602.

In a step S803, the AP 110 initialises a second frequency allocation descriptor F'=(F'(1), . . . , F'(N)) intended to describe, for each time resource of the considered frame period, which frequency resource among the candidate frequency resources is allocated. In the step S803, the second frequency allocation descriptor F' is initialised such that the information F'(k)·f_ID of each one of the N elements F'(k) of the second frequency allocation descriptor F' is empty.

In a step S804, the mobile terminal 122 initialises the index k to the value "1". The mobile terminal 122 further initialises the index j to the value "1".

In a step S805, the mobile terminal 122 checks whether the index j has or not a value less than L+1. When the second variable j has not a value less than L+1, which means that the whole frequency occurrence descriptor G has been parsed, the algorithm ends in a step S806; otherwise, a step S807 is performed.

In the step S807, the mobile terminal 122 initialises an index m, local to the algorithm of FIG. 8, to the value "1". The index m is used to parse the quantity of occurrences indicated in the information G(j)·Nb in each element G(j) of the frequency occurrence descriptor G.

In a step S808, the mobile terminal 122 checks whether the index m has or not a value less than G(j)·Nb+1 according to the actual value of the index j. When the index m has not a value less than G(j)·Nb+1, a step S809 is performed, which means that all occurrences for the frequency resource identified by the current value of the second variable j have been taken into account; otherwise, a step S810 is performed.

In the step S809, the mobile terminal 122 increments by one unit the index j in order to consider to the following element of the frequency occurrence descriptor G, if any, i.e. in order to consider another candidate frequency resource.

In the step S810, the mobile terminal 122 considers that the frequency resource for the time resource relative to the actual value of the index k is the one to which the value of the index j refers. Said time resource relative to the actual value of the index k is identified by said actual value of the index k when no transmission allocation rule is particularly defined, i.e. when the time resources are considered in order of appearance in the frame period. Said time resource relative to the actual value of the index k is identified by the information TA(k)·t_ID when the transmission allocation descriptor TA is used.

In a step S811, the mobile terminal 122 updates the second frequency allocation descriptor F' in accordance with the step S809. When no transmission allocation rule is particularly defined, the mobile terminal 122 updates the information F'(k)·f_ID of the element F'(k) of the second frequency allocation descriptor F' with the actual value of the index j. When the transmission allocation descriptor TA is used, the mobile terminal 122 updates the information F'(TA(k)·t_ID)·f_ID of the element F'(TA(k)·t_ID) of the second frequency allocation descriptor F' with the actual value of the index j.

In a step S812, the mobile terminal 122 increments by one unit the index k in order to consider, in the determination of the second frequency allocation descriptor F', another time resource in the considered frame period, if any. The mobile terminal 122 further increments by one unit the index m in order to take into account another occurrence for the frequency identified by the index j, if any.

Once the algorithm of FIG. 8 ends, the mobile terminal 122 is thus aware of the sequence of frequency resources used over the considered frame period for the K individual transmissions considered as a whole.

The invention claimed is:

1. A method for performing K individual transmissions between an access point managing a cell of a wireless communications network and plural mobile terminals attached to said access point within said cell, the K individual transmissions being performed via time and frequency resources from amongst a predefined set of candidate time and frequency resources on a per frame period basis, each time and frequency resource being a predefined frequency resource usable over a predefined time resource, one time and frequency resource being allocated to each one of the K individual transmissions in a considered frame period, characterized in that the access point performs:

obtaining a first frequency allocation descriptor F indicating which frequency resource is allocated in the considered frame period to each one of the K individual transmissions;

obtaining a frequency occurrence descriptor G indicating how many times each candidate frequency resource is used for performing the K individual transmissions in the considered frame period;

signalling the frequency occurrence descriptor G in said cell; and enabling transmission of data for the K individual transmissions in accordance with the first frequency allocation descriptor F and a predetermined frequency sequencing rule, the predetermined frequency sequencing rule indicating in which order the candidate frequency resources shall be considered in view of the frequency occurrence descriptor G within the frame periods, and wherein the access point further provides an indication enabling the mobile terminals attached thereto to determine which time resource in the considered frame period is associated with each one of the K individual transmissions.

2. The method according to claim 1, characterized in that, the frequency occurrence descriptor G being composed of L elements G(j) comprising information identifying a quantity G(j)·Nb of occurrences of the frequency resource to which said element refers in the considered frame period, j being an index, L being the quantity of candidate frequency resources in the considered frame period, signalling the frequency occurrence descriptor G is performed according to a differential bitmapping in which the quantity of occurrences of each frequency resource identified by the index j is represented by the quantity G(j)·Nb of successive bits having one value and in which the representation of the occurrences for one frequency resource identified by the index j is separated from the representation of the occurrences for a following frequency resource identified by the index j+1 by a bit having another value.

3. The method according to claim 1, characterized in that the access point determines the frequency occurrence descriptor G from the first frequency allocation descriptor F indicating which frequency resource is allocated in the considered frame period to each one of the K individual transmissions.

4. The method according to claim 1, characterized in that the access point transmits the data for the K individual transmissions further in accordance with a predetermined transmission allocation rule defining in which order the time resources shall be considered in view of the frequency occurrence descriptor G and in view of the frequency sequencing rule within each frame period.

5. The method according to claim 4, characterized in that the order in which the time resources shall be considered in view of the frequency occurrence descriptor G and in view of the frequency sequencing rule within each frame period is randomly defined for said cell and wherein the access point provides information representative of the resulting transmission allocation rule to the mobile terminals attached thereto.

6. The method according to claim 4, characterized in that the access point is connected to a server further connected to other access points managing other respective cells, and wherein the server defines such a transmission allocation rule for one said cell and by circularly shifting the order the time resources shall be considered within each other said cell, and wherein the server provides information representative of the resulting transmission allocation rules to the respective access points, and wherein the access point provides said information to the mobile terminals attached thereto.

7. The method according to claim 1, characterized in that, for providing the indication enabling the mobile terminals to determine which time resource in the considered frame period is associated with each one of the K individual transmissions, considering that the considered frame period is dedicated to downlink communications, the access point includes in the data transmitted for each one of the K individual transmissions an identifier representative of said individual transmission.

8. The method according to claim 7, characterized in that, considering that the K individual transmissions alternate over frame periods between downlink and uplink communications in a predefined manner, the access point includes in the data transmitted for each one of the K individual transmissions of said considered frame period an identifier representative of a time resource to be used for uplink communication of said individual transmission in a subsequent frame period.

9. The method according to claim 1, characterized in that, for providing the indication enabling the mobile terminals to determine which time resource in the considered frame period is associated with each one of the K individual transmissions, the access point performs:
signalling in said cell, for each time resource of the considered frame period, whether said time resource is intended to be used for downlink communication or for uplink communication, in association with an identifier representative of the individual transmission to which said time resource is allocated.

10. The method according to claim 1, characterized in that, for providing the indication enabling the mobile terminals to determine which time resource in the considered frame period is associated with each one of the K individual transmissions, considering that the K individual transmissions alternate over frame periods between downlink and uplink communications in a predefined manner, the access point performs:
signalling in said cell, for each time resource of the considered frame period, an identifier representative of the individual transmission to which said time resource is allocated.

11. An access point adapted for performing K individual transmissions between said access point intended to manage a cell of a wireless communications network and plural mobile terminals intended to be attached to said access point within said cell, the K individual transmissions being intended to be performed via time and frequency resources from amongst a predefined set of candidate time and frequency resources on a per frame period basis, each time and frequency resource being a predefined frequency resource usable over a predefined time resource, one time and frequency resource being intended to be allocated to each one of the K individual transmissions in a considered frame period, characterized in that the access point comprises:
means for obtaining a first frequency allocation descriptor F indicating which frequency resource is allocated in the considered frame period to each one of the K individual transmissions;
means for obtaining a frequency occurrence descriptor G indicating how many times each candidate frequency resource is used for performing the K individual transmissions in the considered frame period;
means for signalling the frequency occurrence descriptor G in said cell; and
means for enabling transmission of data for the K individual transmissions in accordance with the first frequency allocation descriptor F and a predetermined frequency sequencing rule, the predetermined frequency sequencing rule indicating in which order the candidate frequency resources shall be considered in view of the frequency occurrence descriptor G within the frame periods,
and wherein the access point further comprises means for providing an indication enabling the mobile terminals attached thereto to determine which time resource in the considered frame period is associated with each one of the K individual transmissions.

12. A mobile terminal adapted for receiving data of one among K individual transmissions from an access point managing a cell of a wireless communications network to plural mobile terminals intended to be attached to said access point within said cell, the K individual transmissions being intended to be performed via time and frequency resources from amongst a predefined set of candidate time and frequency resources on a per frame period basis, each time and frequency resource being a predefined frequency resource usable over a predefined time resource, one time and frequency resource being intended to be allocated to each one of the K individual transmissions in a considered frame period, characterized in that said mobile terminal, which is intended to be attached to the access point, comprises:
means for receiving via signalling a frequency occurrence descriptor G indicating how many times each candidate frequency resource is used for performing the K individual transmissions in the considered frame period;
means for determining, from the received frequency occurrence descriptor G and from a predetermined frequency sequencing rule, a second frequency allocation descriptor F' describing which frequency resource has been allocated for each time resource in sequence of the considered frame period, the predetermined frequency sequencing rule indicating in which order the candidate frequency resources shall be considered in view of the frequency occurrence descriptor G within the frame periods;

means for obtaining from the access point an indication enabling the mobile terminals attached to said access point to determine which time resource in the considered frame period is associated with each one of the K individual transmissions; and means for receiving data for the K individual transmissions in accordance with the second frequency allocation descriptor F' and further in accordance with the obtained indication.

* * * * *